(12) United States Patent
Yoshimura

(10) Patent No.: US 6,999,259 B2
(45) Date of Patent: Feb. 14, 2006

(54) MASTER DISC AND METHOD OF MANUFACTURING THE SAME

(75) Inventor: Hiroyuki Yoshimura, Tokyo (JP)

(73) Assignee: Fuji Electric Co., Inc., (JP)

( * ) Notice: Subject to any disclaimer, the term of this patent is extended or adjusted under 35 U.S.C. 154(b) by 297 days.

(21) Appl. No.: 10/658,792

(22) Filed: Sep. 9, 2003

(65) Prior Publication Data

US 2004/0160694 A1  Aug. 19, 2004

(30) Foreign Application Priority Data

Feb. 13, 2003 (JP) ............................. 2003-035652

(51) Int. Cl.
*G11B 5/09* (2006.01)
(52) U.S. Cl. ........................ 360/48; 360/40; 360/49; 360/78.14
(58) Field of Classification Search ............... None
See application file for complete search history.

(56) References Cited

U.S. PATENT DOCUMENTS

| | | | | |
|---|---|---|---|---|
| 4,949,200 A | * | 8/1990 | Weng | 360/72.2 |
| 4,977,472 A | * | 12/1990 | Volz et al. | 360/78.14 |
| 5,231,545 A | * | 7/1993 | Gold | 360/49 |
| 5,517,631 A | * | 5/1996 | Machado et al. | 711/111 |
| 5,596,460 A | * | 1/1997 | Greenberg et al. | 360/78.14 |
| 5,737,142 A | * | 4/1998 | Zook | 360/49 |
| 6,498,695 B1 | * | 12/2002 | Kosugi | 360/48 |
| 6,583,943 B1 | * | 6/2003 | Malone, Sr. | 360/48 |
| 6,812,868 B1 | * | 11/2004 | Yamakawa et al. | 341/59 |

FOREIGN PATENT DOCUMENTS

JP  2001-283433  10/2001

* cited by examiner

*Primary Examiner*—David Hudspeth
*Assistant Examiner*—Dismery Mercedes
(74) *Attorney, Agent, or Firm*—Rossi, Kimms & McDowell, LLP

(57) ABSTRACT

Magnetic transfer can be performed with high reliability by shortening the magnetic transit interval of servo address information, that is, a section in which "0" or "1" continues. An area for registering information indicating a start position of data inversion or non-inversion of the servo address information is formed between a servo detection pattern and servo address information of the servo signal. When a continuing data section exceeds a predetermined section in a data sequence of the servo address information, the data at the subsequent portion to the exceeding position are inverted or non-inverted, and the exceeding position is registered as a start position for inversion or non-inversion in the area.

12 Claims, 12 Drawing Sheets

| Data Before Moduation | Data After Modulation |
|---|---|
| 01 | X01 |
| 10 | 010 |
| 11 | X011 |
| 0001 | X00001 |
| 0010 | X00000 |
| 0011 | 010001 |
| 0000 | 010000 |

X is 1 when the bit after modulation is 0

MASTER DISC AND METHOD OF MANUFACTURING THE SAME

BACKGROUND

Present hard disc drives (abbreviated as HDDs) include one or more magnetic discs that use a magnetic film as a recording medium. The HDDs are typically used as a storage device for a computer.

In HDDs, the recording/reproducing data is performed by a magnetic head. The magnetic head is floated from the surface of a rotating magnetic disc away from the surface of the magnetic disc with a gap of several tens nm using a floating mechanism (slider). Bit information on the magnetic disc is stored in the data tracks arranged concentrically on the medium, and the magnetic head is moved and positioned to a target data track on the surface of the recording medium at a high speed to record/reproduce data. A positioning signal (servo signal) is concentrically written to the magnetic disc to detect the relative position between the magnetic head and the data tracks. The magnetic head detects the position thereof at a fixed time interval. A servo signal is written to a magnetic disc using a dedicated device called a servo writer so that it does not deviate from the center of the magnetic disc (or the center of the locus of the magnetic head) after the magnetic disc is installed in HDD.

The recording density of the magnetic recording medium, such as a magnetic disc or the like, at the present developing stage reaches 100 Gbis/in$^2$, and the storage capacity thereof is increased about 60% per year. In connection with this, there is a tendency for the density of the servo signal for positioning the magnetic head to be increased, while the writing time of the servo signal is increased year by year. The increase of the writing time of the servo signal becomes one critical factor that reduces productivity of the HDD and increases the cost thereof.

In comparison to the servo signal writing system using the magnetic head of the servo writer described above, the writing time of the servo signal can be dramatically shortened by collectively writing the servo signal through a magnetic transfer technique, as disclosed for instance in JP-A-2001-283433. FIGS. 1A–B and 2A–2C illustrate the principle of this magnetic transfer technique. The magnetic transfer is divided into an initial demagnetization step and a transfer pattern writing step.

FIG. 1A shows the initial demagnetization step. FIG. 2A shows a movement path of the magnetic core 14. Here, the magnetic layer 13 is uniformly magnetized in the circumferential direction. A magnetic core 14 having a permanent magnet 15 is moved in the direction of the arrow (pointing right) while it is floated above the surface of a magnetic disc 11 having a magnetic layer 13 on a substrate 12 at a fixed gap or interval (1 mm or less). Initially, the magnetic layer 13 formed on the substrate 12 is not uniformly magnetized in a single direction, but is magnetized in the uniform direction by the magnetic field leaking from the gap 16 of the magnetic core 14. The arrows in the magnetic layer 13 represent the magnetization direction, which is the opposite of the movement direction of the magnetic core 14.

FIG. 1B shows the transfer pattern writing step. FIG. 2B shows a magnetic transfer master disc (master disc) 17 disposed and positioned on the magnetic disc 11. FIG. 2C shows a movement path of the magnetic core 14. The master disc 17 is brought into close contact with the magnetic disc 11, and the magnetic core 14 is moved along the circumferential direction. The servo signal embedded as a magnetization pattern in the master disc 17 is transferred onto the magnetic disc 11 using the magnetic transfer technique described above. The master disc 17 has a soft magnetic layer 20 embedded in a magnetic layer 19 on a silicon substrate 18. In the soft magnetic layer 20, a servo signal to be recorded in a magnetic recording medium is embedded as a magnetization pattern. The magnetic core 14 magnetizes the magnetic disc 11 in the opposite direction to the direction of the magnetic field in the initial demagnetization step through the master disc 17. At this time, magnetic field leaking from the gap 16 infiltrates into the master disc 17 and reaches the magnetic disc 11 in the areas having no soft magnetic layer 20 to magnetize the magnetic layer 13. On the other hand, in the areas having the soft magnetic layer 20, the magnetic field passes through the soft magnetic layer 20 serving as a magnetic path having small magnetic resistance. Thus, the areas below the soft magnetic layer 20 is shielded and thus not written.

FIG. 3 shows the format of the conventional servo signal. The servo signal comprises a servo AGC 31, a servo detection pattern 32, which is a specific pattern for identifying the servo signal, cylinder information 33, sector information 34, and servo burst information 35. The format of the servo signal will be described in detail.

The servo AGC (Automatic Gain Control) 31 is associated with an AGC circuit of an amplifier for amplifying a signal read from a magnetic head. Normally, the AGC circuit of the amplifier operates ordinarily under the assumption that data are written in portions other than the servo signal. However, under the state where only the servo signal is written and no data are written, or under the state where the servo signal is read immediately after the data are written, the gain of the amplifier is approximately kept to the maximum, and thus it is impossible to read the servo signal normally. Therefore, a dibit pattern of all "1" bits, that is, a signal having a fixed frequency (hereinafter referred to as servo frequency) is first written in the servo signal. The gain of the amplifier is returned to the normal level by reading the servo AGC 31. A PLL (Phase Locked Loop) circuit for generating clocks to read the servo signal is synchronized with the servo frequency. About 100 bits are formed as the servo AGC 31.

The servo address information comprises the cylinder information 33 and the sector information 34. The cylinder information of servo tracks is written in the cylinder information 33 while subjected to gray coding. The HDD positions the head to a target track based on the cylinder information 33 and read or writes data there. The gray coding will be described later with reference to FIGS. 4A and 4B. The sector information 34 is information relating to the sectors in the tracks. The sector is an area formed by dividing a track into several hundreds parts, and it serves as a data recording/reproducing area in the HDD. A sector address is normally represented by binary numbers. For example, when 90 sectors are formed on the whole periphery, the sector address has a 7-bit length.

The servo burst information 35 is information to position the magnetic head on a target track after the magnetic head is moved to the target track. In general, the magnetic head is positioned to the center of the target track by comparing the signal amplitude of signals deviated in phase by 180°. The pattern shown in FIG. 3 is a burst pattern in which A, B, C and D are deviated in phase by one track width.

Figures 4A, 4B:
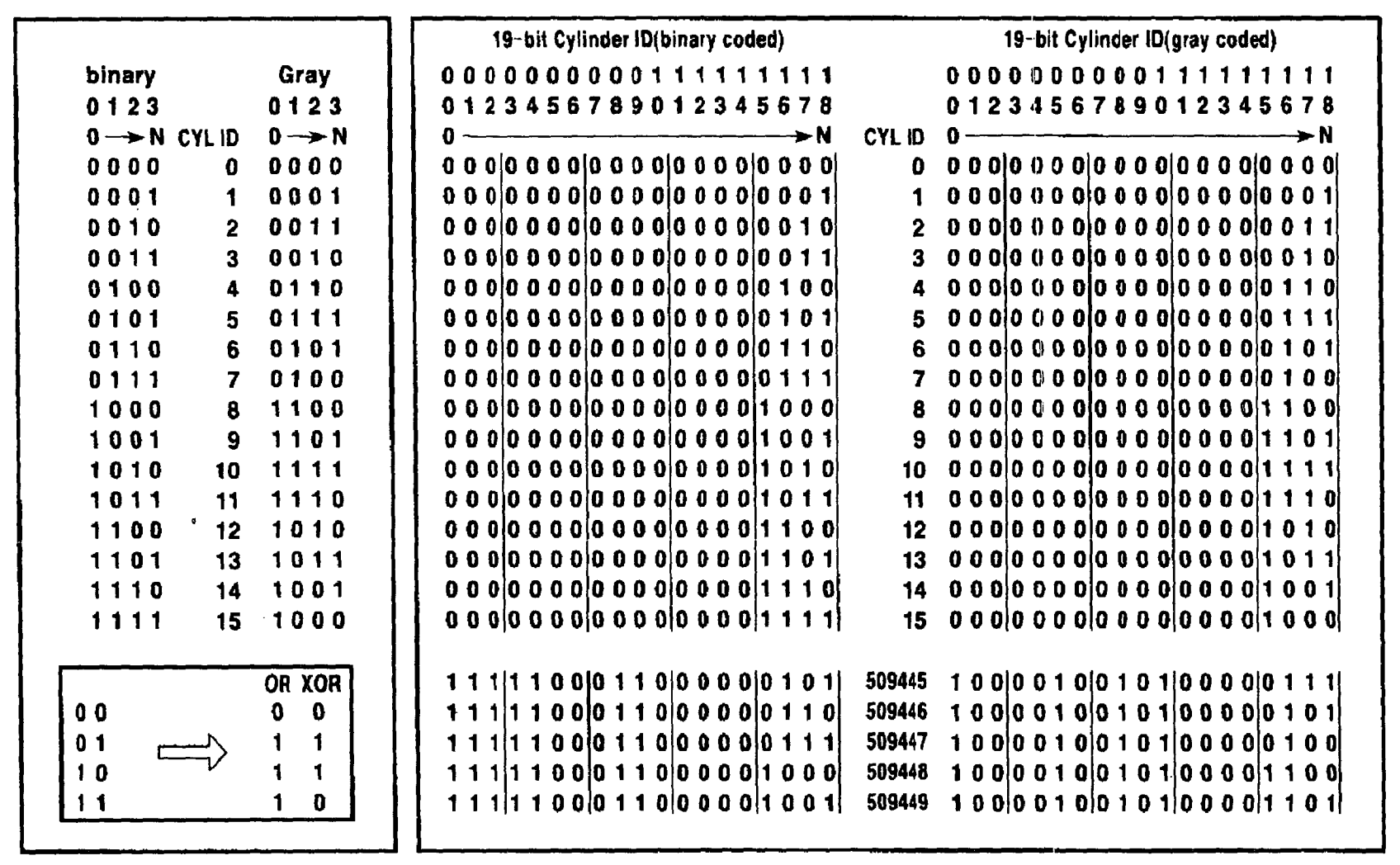

FIGS. 4A and 4B show the gray coding of the conventional cylinder information. FIG. 4A shows a binary gray code conversion rule of 4 bits. FIG. 4B shows a gray code conversion rule in the cylinder information of 19 bits. Only variation of one bit is made between neighboring cylinders by the gray coding. Accordingly, even if any one bit is erroneously read when the cylinder information is read by the magnetic head, the magnetic head is prevented from accessing the correct position. For example, the recording range of a 3.5-inch type magnetic recording medium is equal to about 29,000 tracks per surface when the radius is set to 17.85 to 47.00 mm and the track width is set to 0.1 µm. When three double-sided recordable magnetic recording media are used in the HDD, the total number of cylinders is equal to 2×3×29,000=174,000, which corresponds to 18 bits. When the servo bit length at the radius of 17.85 mm is set to 0.1 µm, the total servo bit length is equal to 1.8 µm and the servo bit length at the radius of 23.5 mm is set to 0.13 µm, the total servo bit length is equal to 2.4 µm. This means that a section in which "0" or "1" continues exists over the length corresponding to the total servo bit length in a specific servo pattern.

A data pattern exists in the magnetic recording medium in addition to the pattern of the servo signal described above. The data pattern is recorded by using an RLL (Run Length Limited) code. The RLL code is represented by using as parameters the minimum magnetization inverted interval: d, the maximum magnetization inverted interval: k, the bit length of original data: m, and the bit length after modulation: n. FIG. 5 shows the conversion rule of an RLL 1-7 code of d=1, k=7. The RLL 1-7 code means that the minimum and maximum values of the magnetization inverted interval are equal to 1 and 7 respectively, the data sequence of 2 bits is converted to 3 bits in principle, and the data sequence of specific 4 bits is converted to 6 bits. FIG. 6 shows a conversion example of the data sequence based on the conventional RLL 1-7 code. The RLL 1-7 code is designed so that one "0" at minimum and seven "0" at maximum exists between "1" and "1," and "0" or "1" does not continue over a long section. Since bit length is set to 0.1 µm, a section in which "0" or "1" continues is equal to 0.7 µm.

When the servo signal is written using the magnetic transfer technique described above in the 3.5-inch type magnetic recording medium, the magnetic transit interval of the servo address information, that is, the section where "0" or "1" continues covers a broad range from the data bit length of 0.1 µm to the total servo bit length of 2.4 µm, which corresponds to about 24 times. FIGS. 7A–7C show the version in magnetic flux density of the magnetic layer when the length and period of the soft magnetic layer are varied. FIG. 7B, illustrates a case where the length W of the soft magnetic layer 20 is equal to 0.7 µm and the interval P is equal to 1.4 µm and FIG. 7C illustrates a case where the length W is equal to 2.0 µm and the interval P is equal to 4.0 µm. The magnetic flux density at the lower portion of the soft magnetic layer 20 is larger when W=2.0 µm and P=4.0 µm. Ideally, the magnetic flux density of the magnetic layer 13 of the magnetic disc 11 at the lower portion of the soft magnetic layer 20 is preferably equal to zero. If the length W of the soft magnetic layer 20 is increased and the interval P of the soft magnetic layer 20 is increased, the magnetic flux of the recording magnetic field flowing into the soft magnetic layer 20 is increased, and the magnetic flux density of the soft magnetic layer 20 is increased, so that the magnetic flux density exceeds the saturated magnetic flux density of the soft magnetic layer 20, and the magnetic field leaks into the magnetic layer 13 of the magnetic disc 11.

FIGS. 8A–8C show the variation in magnetic saturation point at the lower portion of the soft magnetic layer when the length and period of the soft magnetic film are varied. It is apparent that magnetic field leaks due to magnetic saturation. On the other hand, the magnetic flux density in the gap between the two soft magnetic layers 20 is smaller when W=2.0 µm and P=4.0 µm. This is because when the interval between the two soft magnetic layers 20 is large, the magnetic fluxes passing through the soft magnetic layers 20 pass nearer to the magnet side, so that the magnetic flux density in the magnetic layer 13 of the magnetic disc 11 is reduced.

As shown in FIGS. 1A–1B, the magnetic transfer is carried out in both the initial demagnetization step and the transfer pattern writing step. To ensure a complete magnetic transfer on the whole surface of the magnetic disc, it is necessary to reduce the leakage of magnetic flux density at the lower portion of the soft magnetic layer and increase the magnetic flux density between the soft magnetic layer and the soft magnetic layer. As shown in FIGS. 7A–7C and 8A–8C, when the length of the soft magnetic layer is increased and the interval is also increased, the leakage of the magnetic flux density at the lower portion of the soft magnetic layer is increased, and the magnetic flux density is reduced between the soft magnetic layers. As a calculation example, the difference corresponds to about three times in the length W of the soft magnetic layer and twice in the interval. However, when the magnetic transit interval of the servo address information covers a broad range of about 24 times, this tendency is further remarkable. That is, some portion is not subjected to magnetization inversion, and thus it is difficult to fully carry out the magnetic transfer.

The present invention has been implemented in view of the foregoing problem. There remains a need for a master disc that can carry out magnetic transfer with high reliability. The present invention addresses this need.

SUMMARY OF THE INVENTION

The present invention relates to a master disc and a method of manufacturing the same, and more specifically to a master disc in which a servo signal used for positioning a magnetic head is written by using a magnetic transfer technique, and a method of manufacturing the master disc.

One aspect of the present invention is a master disc. The master disc has a magnetic layer and a registering area. The magnetic layer contains a magnetization pattern embedded therein as a servo signal composed of a servo detection pattern and servo address information to be written to a magnetic recording medium. The registering area, which registers the information indicating a start position for inverting or non-inverting data of the servo address information, is formed between the servo detection pattern and the servo address information of the servo signal. The servo address information has a first section and a second section each containing a predetermined number of bits.

When all of the predetermined number of bits of the first section contain the same "0" or "1," and a beginning bit of the second section begins with the same "0" or "1" of the first section, the second section is inverted and the beginning bit of the second section is registered in the area as a start position of inversion. When a beginning bit of the second section does not begin with the same "0" or "1" of the first section, the second section is not inverted and the beginning bit of the second section is registered in the area as a start position of non-inversion.

The servo address information has a third section containing a predetermined number of bits. When all of the predetermined number of bits of the second section, whether inverted or non-inverted, contains the same "0" or "1," and a beginning bit of the third section begins with the same "0" or "1" of the second section, the third section is inverted and the beginning bit of the third section is registered in the area as a start position of inversion. When the beginning bit of the third section does not begin with the same "0" or "1" of the second section, the third section is not inverted and the beginning bit of the third section is registered in the area as a start position of non-inversion. When the second section is inverted and the third section is not inverted, the second section can be registered in the area as inverted bits.

The servo address information can have cylinder ID information that is subjected to 18-bit cylinder information to gray coding, wherein each of the cylinder ID has the first section composed of seven bits, the second section composed of seven bits, and the third section composed of 4 bits.

Another aspect of the present invention is a method of manufacturing the master disc by providing the magnetic layer, providing the area as previously described, and inverting the second section and registering the beginning bit of the second section in the area as a start position of inversion when all of the predetermined number of bits of the first section contain the same "0" or "1," and the beginning bit of the second section begins with the same "0" or "1" of the first section. The beginning bit of the second section is registered in the area as a start position of non-inversion when the beginning bit of the second section does not begin with the same "0" or "1" of the first section. The third section is inverted and the beginning bit of the third section is registered in the area as a start position of inversion when all of the predetermined number of bits of the second section, whether inverted or non-inverted, contain the same "0" or "1," and the beginning bit of the third section begins with the same "0" or "1" of the second section. The beginning bit of the third section is registered in the area as a start position of non-inversion when the beginning bit of the third section does not begin with the same "0" or "1" of the second section. When the second section is inverted and the third section is not inverted, the second section can be registered in the area as inverted bits.

BRIEF DESCRIPTION OF THE DRAWINGS

FIGS. 4A and 4B are diagrams showing the gray coding of a conventional cylinder information.

FIG. 5 is a diagram showing the conversion rule of a conventional RLL1-7 code.

FIGS. 10A and 10B are diagrams showing an embodiment of the cylinder information according to the present invention.

DETAILED DESCRIPTION

A magnetic recording medium according to the present invention has a new area for registering information indicating the start position to invert or not invert the data of servo address information as data inversion location information between a servo detection pattern and the servo address information.

When a section where the data of "0" or "1" continues exceeds a predetermined section in the data sequence of the servo address information, the data at the subsequent portion to the exceeding position are inverted. In addition to the inversion, the exceeding position is registered as a data inversion start position in the data inversion location information. When the section where "0" or "1" continues exceeds a predetermined section again, the data at the subsequent portion to the exceeding position are not inverted. In addition to not inverting, the exceeding position is registered as a data non-inversion start position in the data inversion location information.

Likewise, the data inversion and non-inversion are repeated until the end of the servo address information to form a servo signal. Accordingly, the section where the data of "0" or "1" continues does not exceed to a different section. On the other hand, reproduction is carried out by using a magnetic head, the data inversion location information is read and an indicated portion of the servo address information reproduced is inverted or not inverted.

Figure 9:
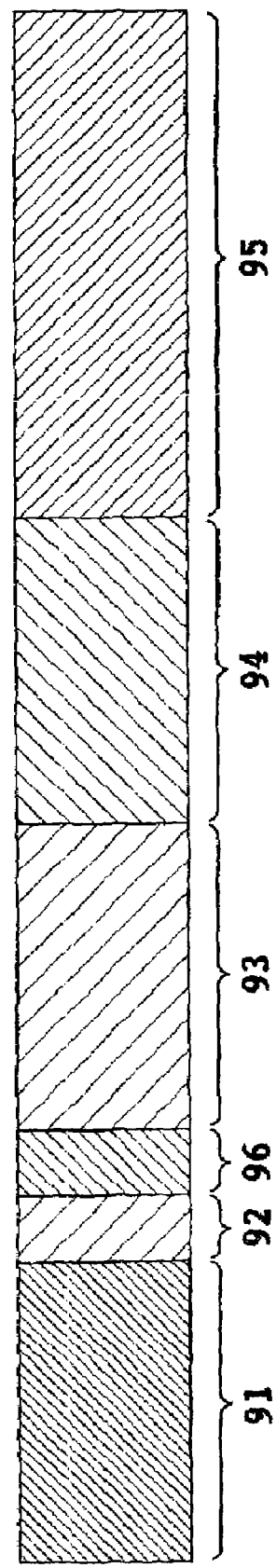
FIG. 9 is a diagram showing the format of an embodiment of a servo signal according to the present invention.

FIG. 9 shows the format of the servo signal according to one embodiment of the present invention. The servo signal comprises a servo AGC 91, a servo detection pattern 92, and servo address information containing cylinder information 93 and sector information 94 and servo burst information 95. Further, an area for data inversion location information 96 indicating the inversion position of the servo address information is formed between the servo detection pattern 92 and the cylinder information 93.

Figures 10A, 10B:
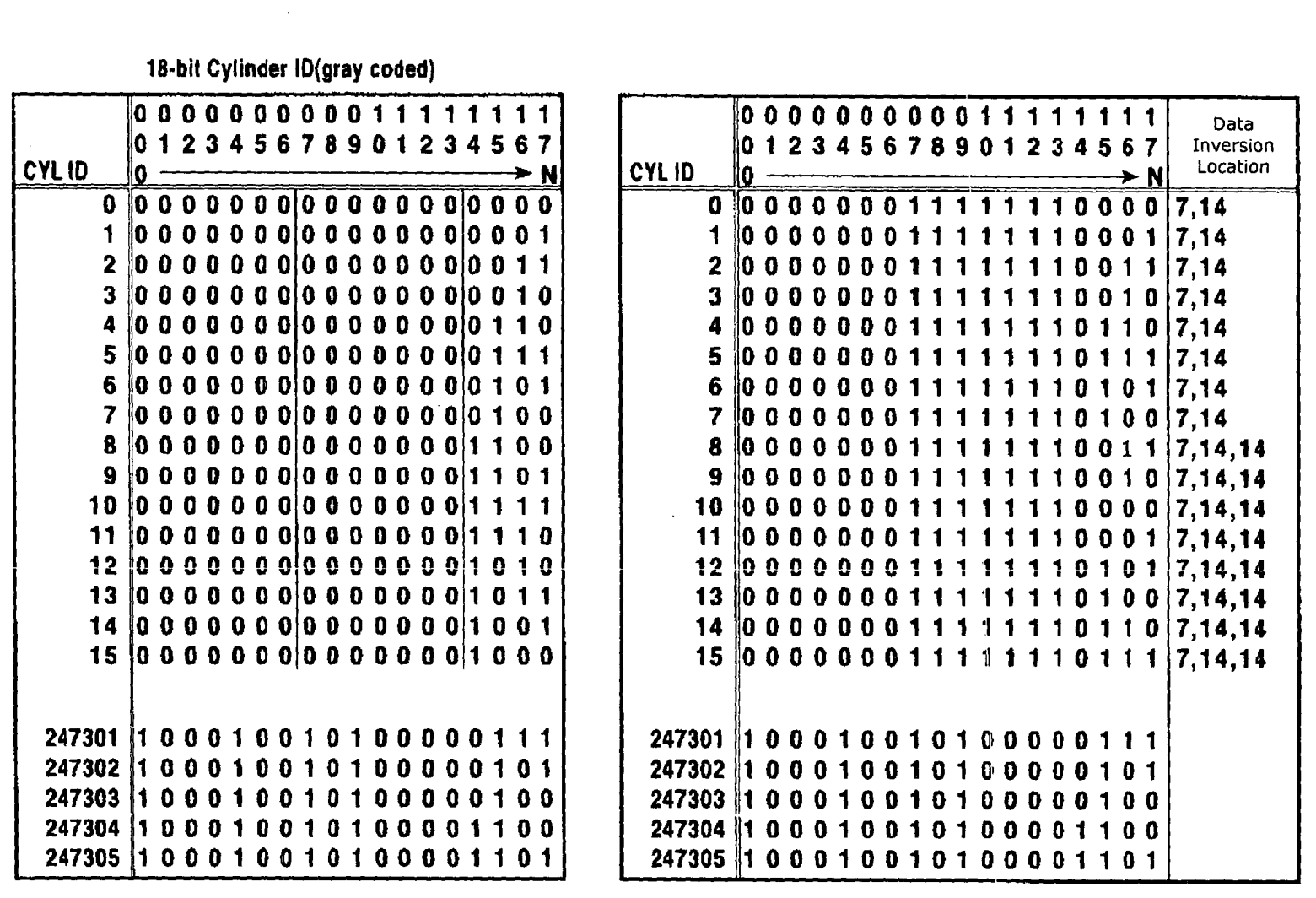

FIGS. 10A and 10B show the cylinder information according to the present invention. FIG. 10A shows the result achieved by subjecting 18-bit cylinder information to gray coding. In cylinder ID: 0 to 15, the state of "0" exceeds 7 bits. FIG. 10B shows the result achieved by inverting the data sequence of the cylinder information. That is, by inverting the data of the seventh and subsequent bits, the sections in which the state of "0" continues are limited to 7 bits or less (from zero bit to sixth bit). Then, with respect to the cylinder ID: 0 to 7, the bits at the fourteenth bit is maintained (not inverted) so that the sections in which the state of "1" continues are limited to 7 bits or less (from the seventh bit to thirteenth bit). Furthermore, with respect to the cylinder ID: 8 to 15, if the bits at the fourteenth bit is not inverted, the state of "1" would exceeds 7 bits. Thus the bits at the fourteenth and subsequent bits are inverted. Here, when each of the inversion and non-inversion of data is set as a unit, the data inversion location information is 7 (inversion) and 14 (non-inversion) in the cylinder ID: 0 to 7, and 7 (inversion) and 14 (non-inversion) and 14 (inversion) in the cylinder ID: 8 to 15.

Figure 11:
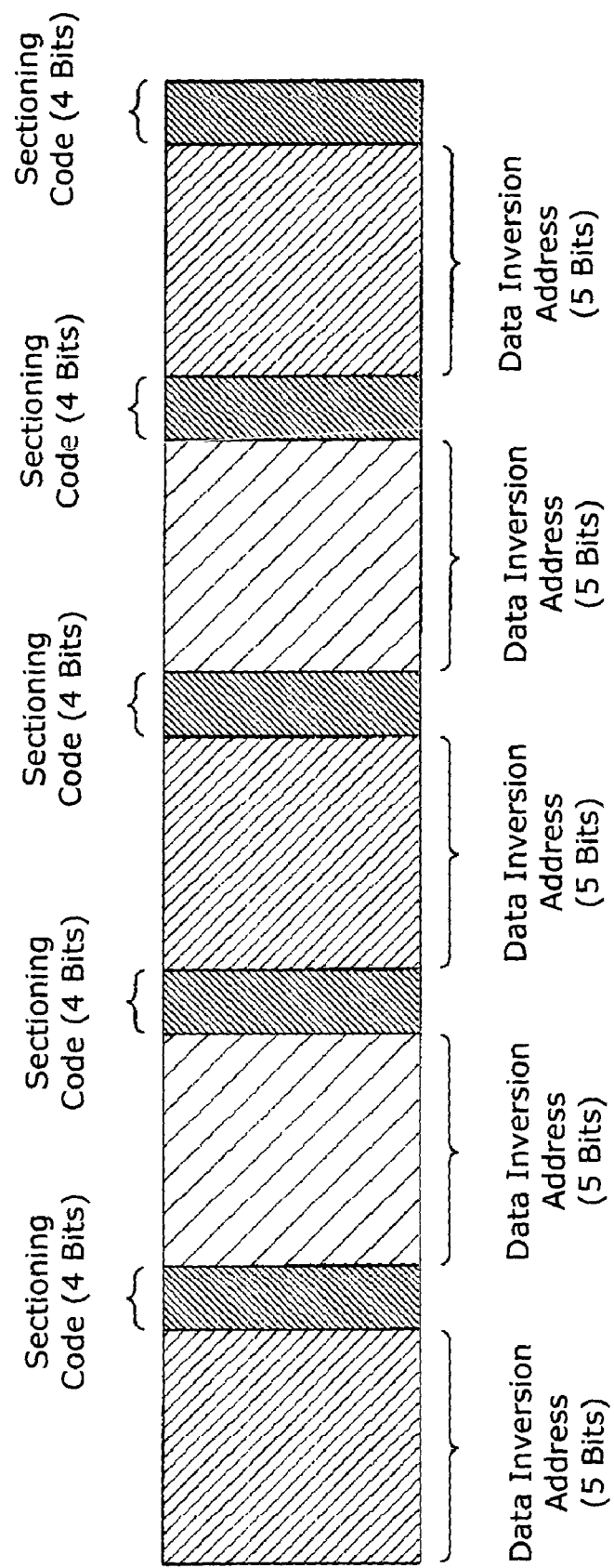
FIG. 11 is a diagram of a first embodiment of the data inversion location information according to the present invention.

Next, the data inversion location information will be described. FIG. 11 shows a first embodiment of data inversion location information according to the present invention. It alternately shows the exceeding position (inversion start position) at which a data-continuing section exceeds a predetermined section, and an exceeding position (non-inversion start position) at which a data-continuing section exceeds a predetermined section again. When the cylinder information comprises 18 bits and the sector information comprises 7 bits, it totals 25 bits. Representing a bit position as an address, it corresponds to 5 bits. Since three inversion positions and two non-inversion positions are needed at maximum, a total of 25 bits are needed. Furthermore, assuming that a sectioning code of 4 bits of "0110" is inserted every 5 bits in consideration of the 7-bit restriction for sectioning the data inversion location and magnetic transfer, the area of the data inversion location information totals 45 bits.

Figure 12:
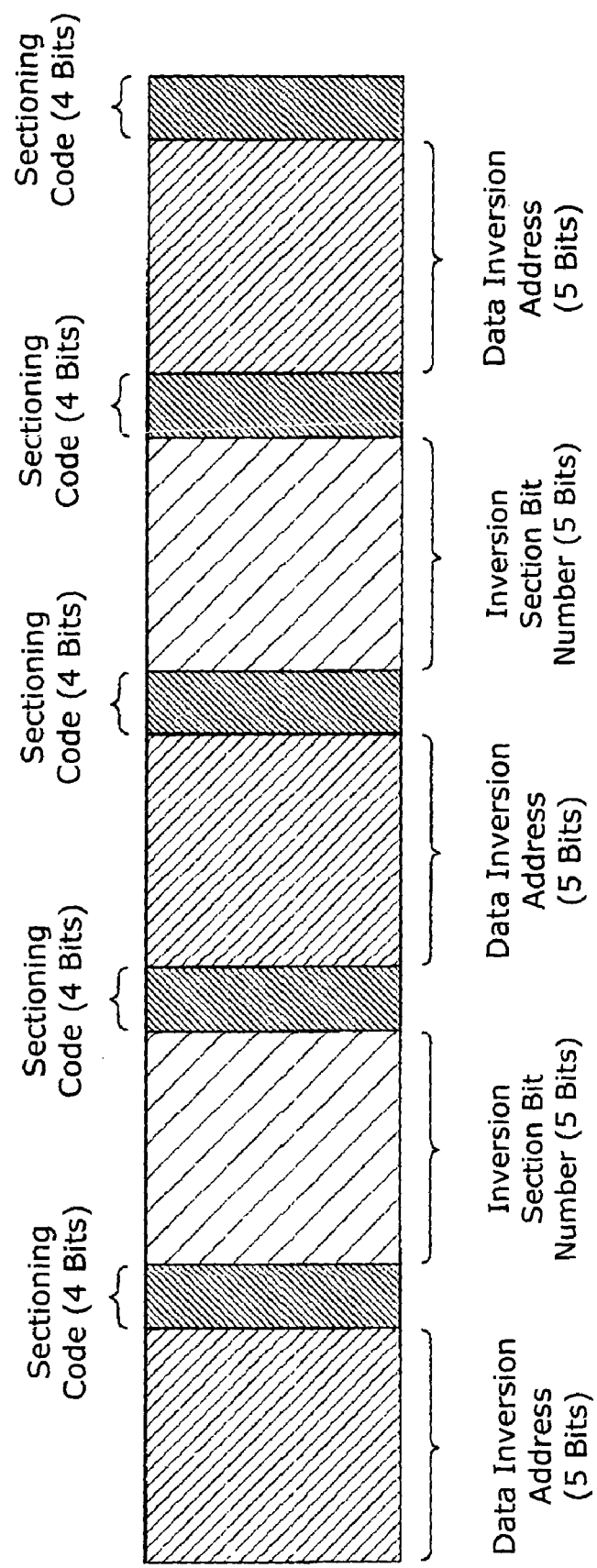
FIG. 12 is a diagram of a second embodiment of the data inversion location information according to present invention.

FIG. 12 shows a second embodiment of data inversion location information according to the present invention. The start positions of the data inversion and the bit number of inversion sections are shown. An exceeding position (inversion start position) at which a data-continuing section exceeds a predetermined section, and the number of inverted bits achieved by calculating the number of bits from the exceeding position for the inversion to the exceeding position for the non-inversion on the basis of an exceeding position (non-inversion start position) at which a data-continuing section exceeds a predetermined section again, are registered in the data inversion location information.

Figure 1A:
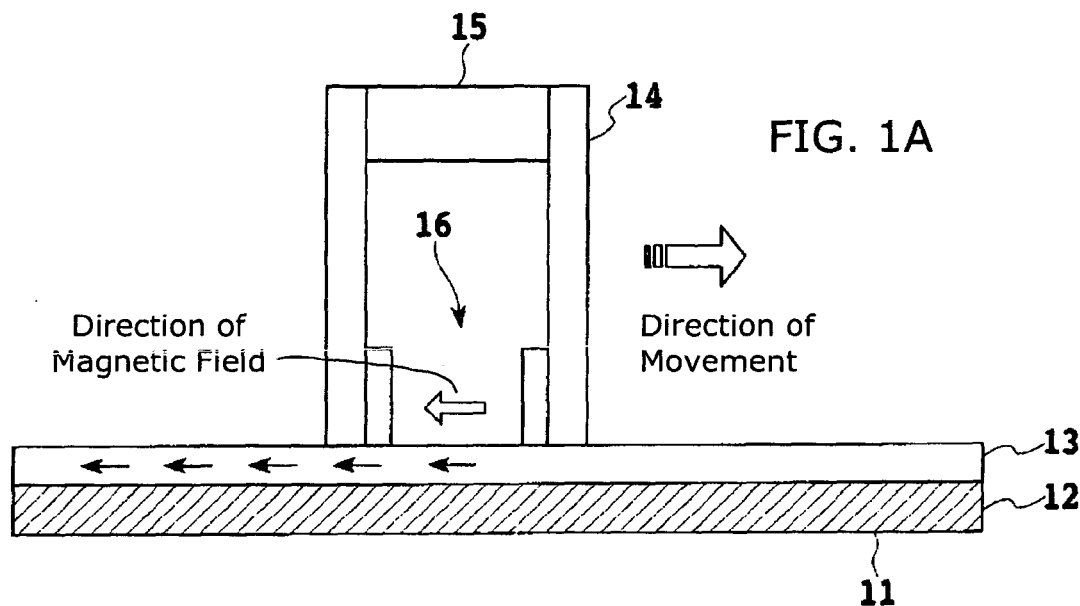
FIGS. 1A and 1B are diagrams showing the principle of a conventional magnetic transfer technique, namely an initial demagnetizing step (FIG. 1A) and a transfer pattern writing step (FIG. 1b).
Figure 1B:
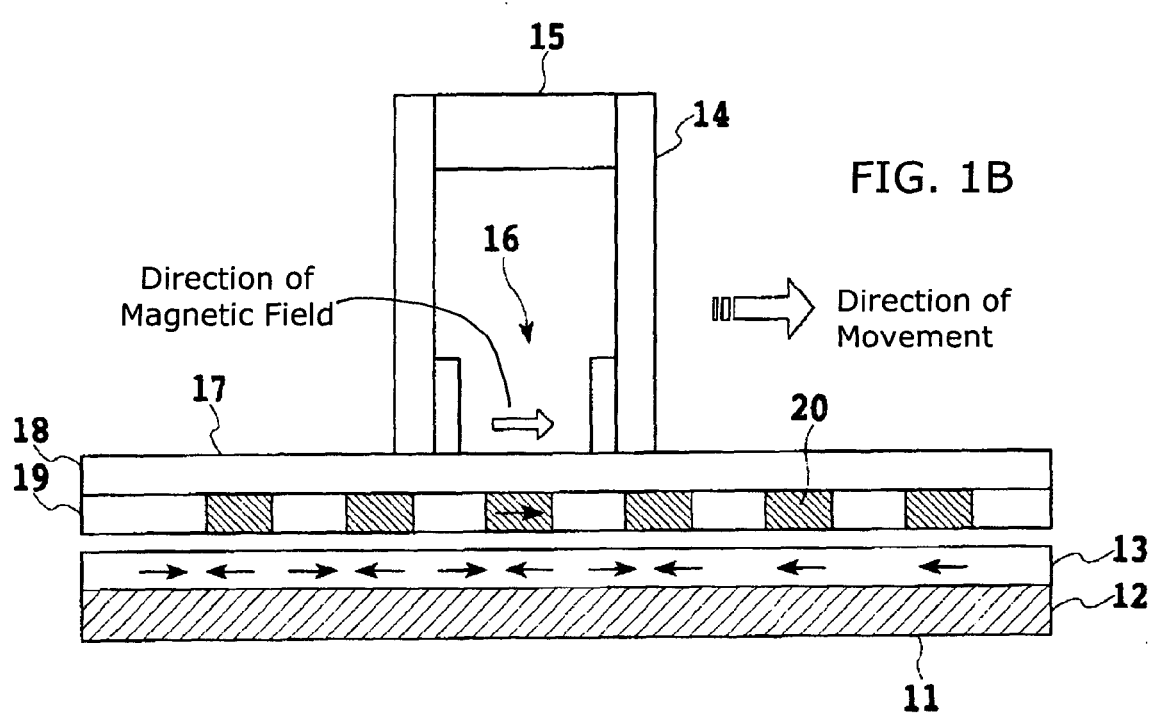
Figure 2A:
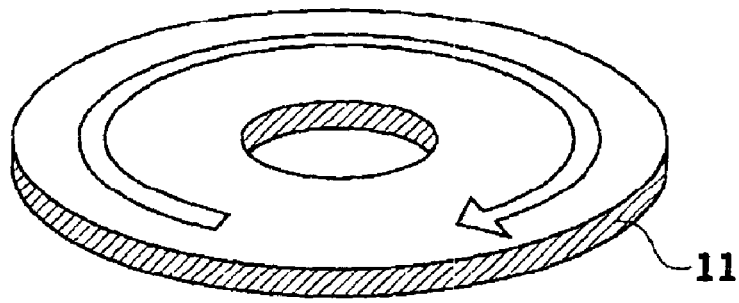
FIGS. 2A–2C are diagrams showing a magnetic transfer technique for a conventional magnetic disc.
Figure 2B:
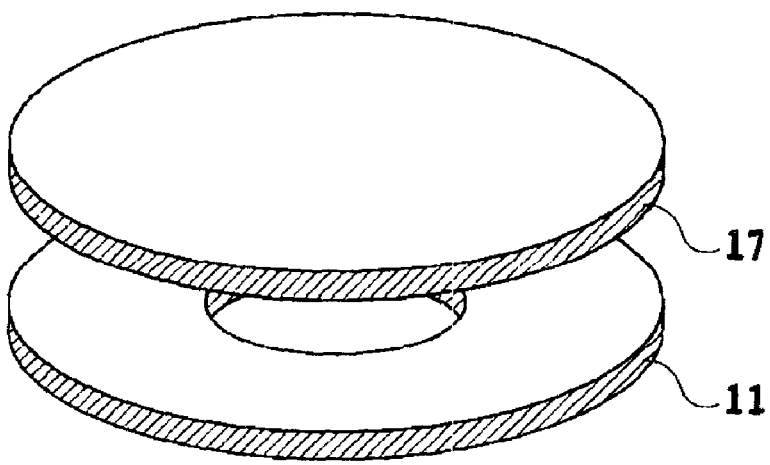
Figure 2C:
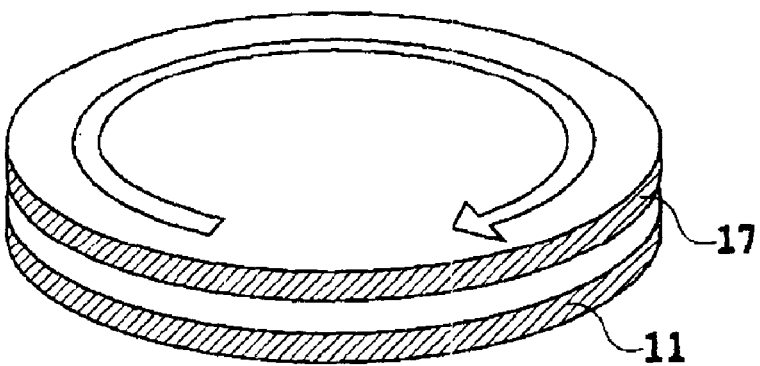
Figure 3:
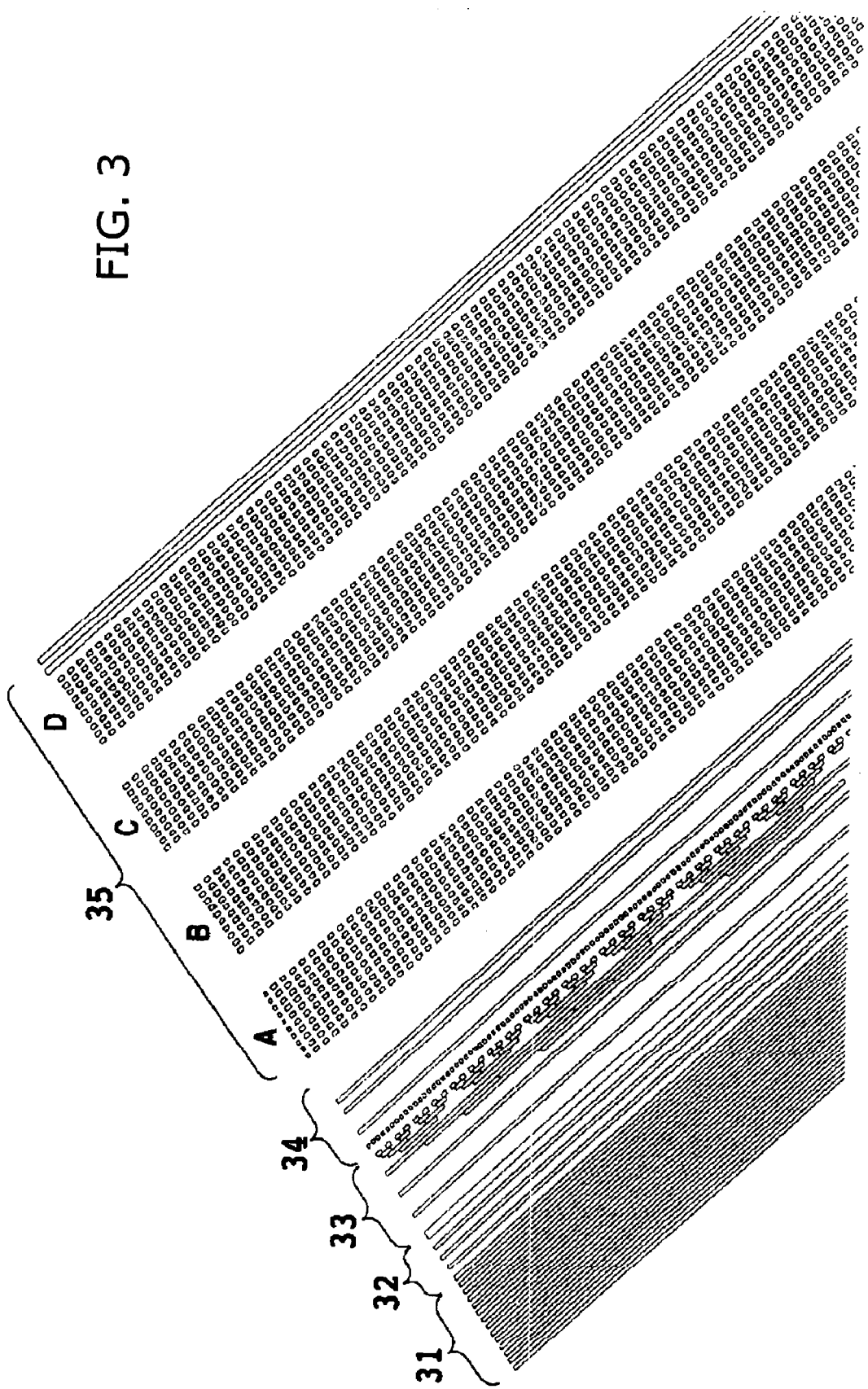
FIG. 3 is a diagram showing the format of a conventional servo signal.
Figure 6:
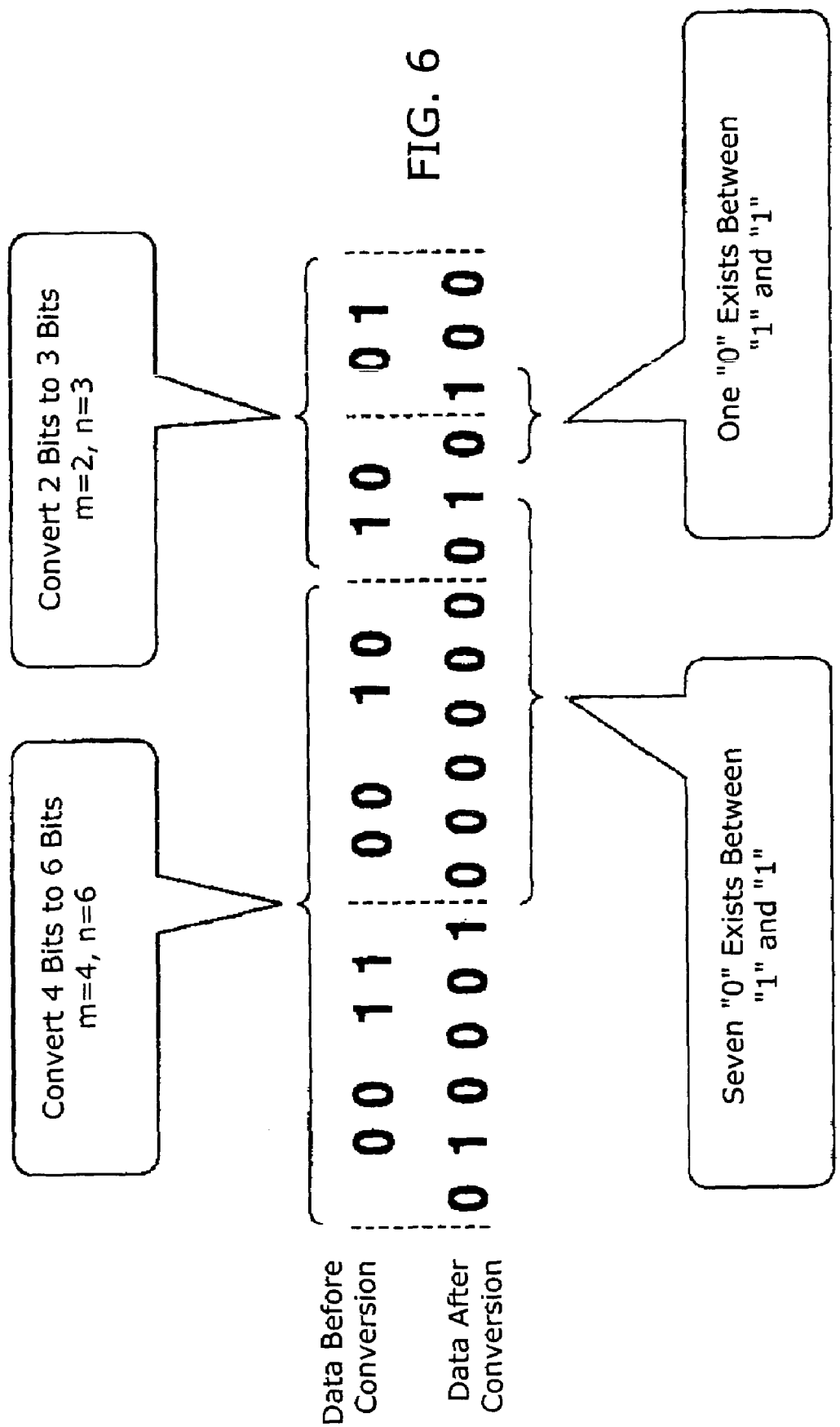
FIG. 6 is a diagram showing a conversion example of a data sequence based on the conventional RLL1-7 code.
Figure 7A:
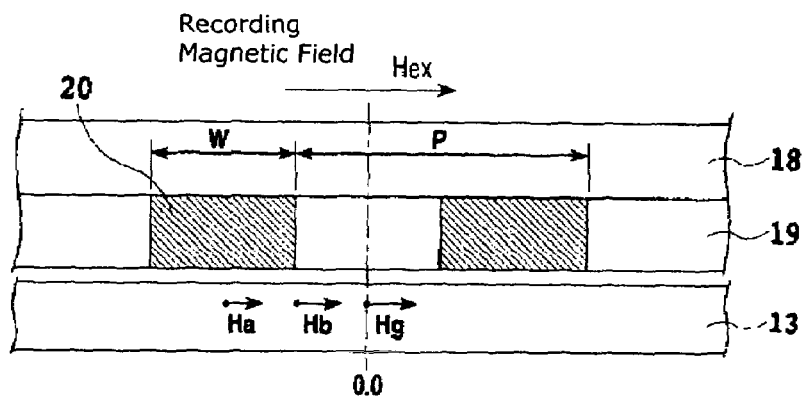
FIGS. 7A–7C are diagrams showing the variation of magnetic flux density in a magnetic layer when the length and period of a soft magnetic layer are varied.
Figure 7B:
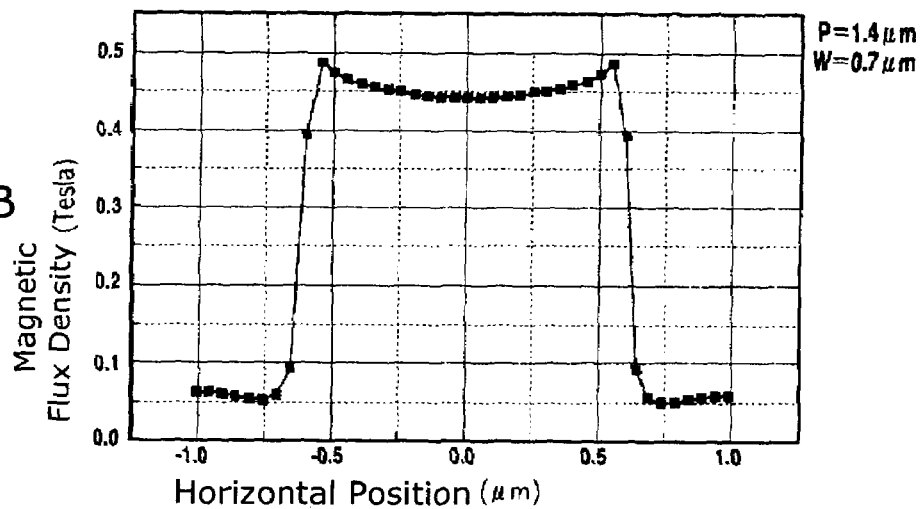
Figure 7C:
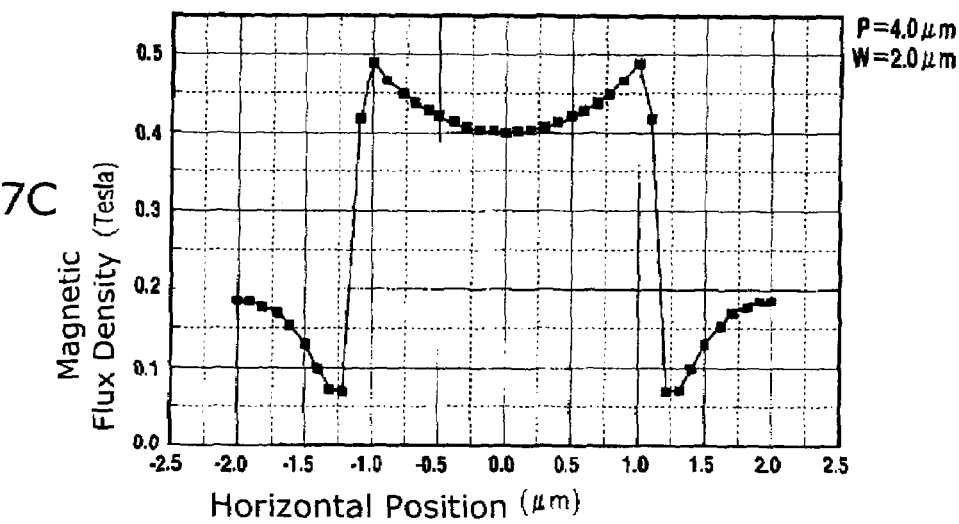
Figure 8A:
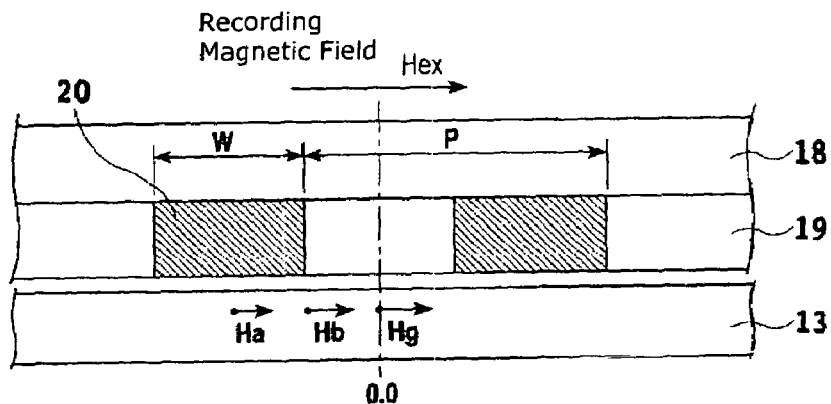
FIGS. 8A–8C are diagrams showing the variation of a magnetic saturation point at the lower portion of a soft magnetic layer when the length and period of the soft magnetic film are varied.
Figure 8B:
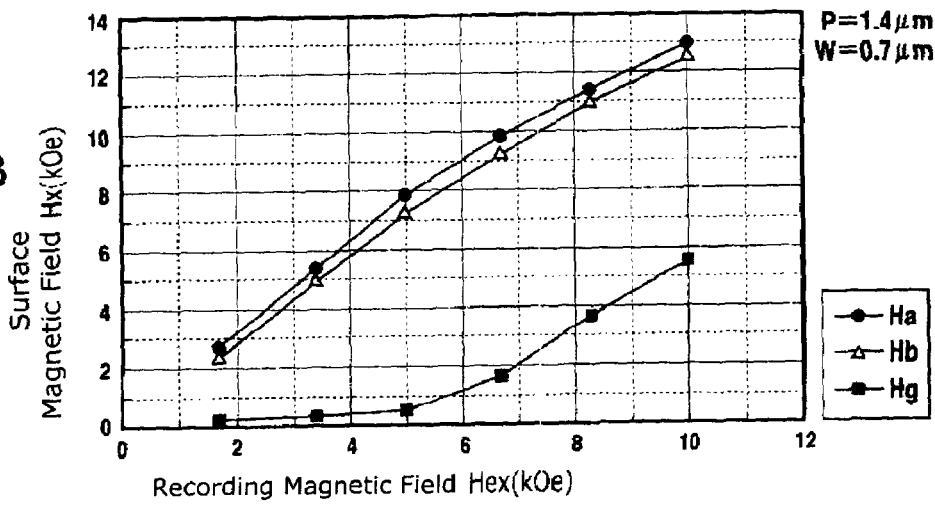
Figure 8C:
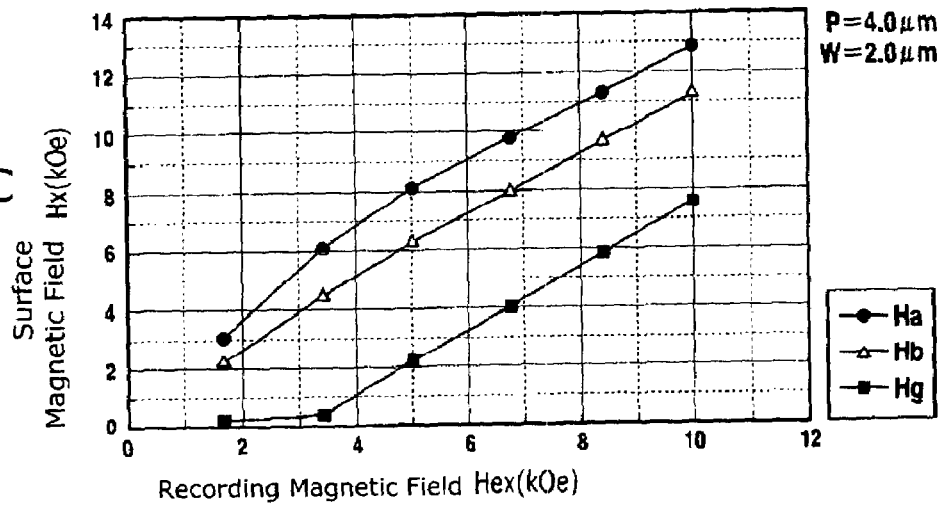

As explained with reference to FIGS. 7A–7C, as the interval of the soft magnetic layer is increased, the magnetic flux density exceeds the saturated magnetic flux density of the soft magnetic layer, and thus the magnetic field leaks into the magnetic layer of the magnetic recording medium. Under this magnetic field, the magnetic field intensity needed for the magnetic inversion runs short, so that a servo signal reproduced contains a sub pulse and thus a bit error occurs. According to the present invention, the section in which "0" or "1" continues does not exceed 7 bits to suppress the sub pulse due to leakage of magnetic field so that a magnetic pattern of a soft magnetic layer embedded in a master disc can be accurately transferred to a magnetic disc.

As described above, according to the present invention, the magnetic transit interval of the servo address information, that is, the section where data of "0" or "1" continues, can be shortened so that magnetic transfer can be performed with high reliability.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2003-035652, in its entirety, including the drawings, claims, and the specification thereof, is incorporated herein by reference.

What is claimed is:

1. A master disc comprising:
   a magnetic layer containing a magnetization pattern embedded therein as a servo signal composed of a servo detection pattern and servo address information to be written to a magnetic recording medium; and
   an area for registering information indicating a start position for inverting or non-inverting data of the servo address information formed between the servo detection pattern and the servo address information of the servo signal,
   wherein the servo address information has a first section and a second section each containing a predetermined number of bits,
   wherein when all of the predetermined number of bits of the first section contain the same "0" or "1," and a beginning bit of the second section begins with the same "0" or "1" of the first section, the second section is inverted and the beginning bit of the second section is registered in the area as a start position of inversion.

2. A master disc according to claim 1, wherein when a beginning bit of the second section does not begin with the same "0" or "1" of the first section, the second section is not inverted and the beginning bit of the second section is registered in the area as a start position of non-inversion.

3. A master disc according to claim 1, wherein the servo address information has a third section containing a predetermined number of bits, and wherein when all of the predetermined number of bits of the second section, whether inverted or non-inverted, contains the same "0" or "1," and a beginning bit of the third section begins with the same "0" or "1" of the second section, the third section is inverted and the beginning bit of the third section is registered in the area as a start position of inversion.

4. A master disc according to claim 3, wherein when a beginning bit of the third section does not begin with the same "0" or "1" of the second section, the third section is not inverted and the beginning bit of the third section is registered in the area as a start position of non-inversion.

5. A master disc according to claim 4, wherein when the second section is inverted and the third section is not inverted, the second section is registered in the area as inverted bits.

6. A master disc according to claim 4, wherein the servo address information has cylinder ID information that is subjected to 18-bit cylinder information to gray coding, wherein each of the cylinder ID has the first section composed of seven bits, the second section composed of seven bits, and the third section composed of 4 bits.

7. A method of manufacturing a master disc, comprising the steps of:
   providing a magnetic layer containing a magnetization pattern embedded therein as a servo signal composed of a servo detection pattern and servo address information to be written to a magnetic recording medium, wherein the servo address information has a first section and a second section each containing a predetermined number of bits;
   providing an area for registering information indicating a start position for inverting or non-inverting data of the servo address information between the servo detection pattern and the servo address information of the servo signal;
   inverting the second section and registering a beginning bit of the second section in the area as a start position of the inversion when all of the predetermined number of bits of the first section contain the same "0" or "1," and the beginning bit of the second section begins with the same "0" or "1" of the first section.

8. A method according to claim 7, comprising the step of registering the beginning bit of the second section in the area as a start position of non-inversion when the beginning bit of the second section does not begin with the same "0" or "1" of the first section.

9. A method according to claim 8, wherein the servo address information has a third section containing a predetermined number of bits, further comprising the step of inverting the third section and registering a beginning bit of the third section in the area as a start position of inversion when all of the predetermined number of bits of the second section, whether inverted or non-inverted, contain the same "0" or "1," and the beginning bit of the third section begins with the same "0" or "1" of the second section.

10. A method according to claim 9, comprising the step of registering the beginning bit of the third section in the area as a start position of non-inversion when the beginning bit of the third section does not begin with the same "0" or "1" of the second section.

11. A method according to claim 10, wherein when the second section is inverted and the third section is not inverted, the second section is registered in the area as the inverted bits.

12. A method according to claim 10, wherein the servo address information has cylinder ID information that is subjected to 18-bit cylinder information to gray coding, wherein each of the cylinder ID has the first section composed of seven bits, the second section composed of seven bits, and the third section composed of 4 bits.

* * * * *

UNITED STATES PATENT AND TRADEMARK OFFICE
CERTIFICATE OF CORRECTION

| | | |
|---|---|---|
| PATENT NO. | : 6,999,259 B2 | |
| APPLICATION NO. | : 10/658792 | |
| DATED | : February 14, 2006 | |
| INVENTOR(S) | : Hiroyuki Yoshimura | |

It is certified that error appears in the above-identified patent and that said Letters Patent is hereby corrected as shown below:

On the title page, item [73]: "Assignee" should be deleted and replaced by the following:

--Fuji Electric Co., Ltd.--

Signed and Sealed this

Sixth Day of March, 2007

JON W. DUDAS
*Director of the United States Patent and Trademark Office*